US012726311B2

(12) United States Patent
Wu et al.

(10) Patent No.: US 12,726,311 B2
(45) Date of Patent: Sep. 1, 2026

(54) CHANNEL ESTIMATION METHOD AND APPARATUS, DEVICE, AND READABLE STORAGE MEDIUM

(71) Applicant: VIVO MOBILE COMMUNICATION CO., LTD., Dongguan (CN)

(72) Inventors: Jianming Wu, Dongguan (CN); Ang Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 376 days.

(21) Appl. No.: 18/513,470

(22) Filed: Nov. 17, 2023

(65) Prior Publication Data

US 2024/0097853 A1 Mar. 21, 2024

Related U.S. Application Data

(63) Continuation of application No. PCT/CN2022/092497, filed on May 12, 2022.

(30) Foreign Application Priority Data

May 19, 2021 (CN) ........................ 202110546723.1

(51) Int. Cl.
*H04L 5/00* (2006.01)
*H04B 17/318* (2015.01)
(Continued)

(52) U.S. Cl.
CPC ......... *H04L 5/0051* (2013.01); *H04B 17/328* (2023.05); *H04L 25/023* (2013.01); *H04W 72/232* (2023.01)

(58) Field of Classification Search
CPC .. H04L 5/0051; H04L 25/023; H04W 72/232; H04B 17/328
See application file for complete search history.

(56) References Cited

U.S. PATENT DOCUMENTS

2004/0248541 A1* 12/2004 Park .................... H04L 25/0234 455/306
2012/0094709 A1* 4/2012 Ogawa .................. H04W 52/16 455/522
2014/0036984 A1 2/2014 W. Charbonneau et al.

FOREIGN PATENT DOCUMENTS

CN 110430150 A 11/2019
CN 111464465 A 7/2020
(Continued)

OTHER PUBLICATIONS

International Search Report issued in corresponding International Application No. PCT/CN2022/092497, mailed Aug. 10, 2022, 4 pages.

(Continued)

*Primary Examiner* — Duc C Ho
(74) *Attorney, Agent, or Firm* — IPX PLLC

(57) ABSTRACT

The present application discloses a channel estimation method and apparatus, a device, and a readable storage medium. The channel estimation method includes: receiving, by a communication device, a pilot signal and a data signal; determining, by the communication device, a linear feature according to the pilot signal; determining, by the communication device, a nonlinear feature according to the data signal; and performing, by the communication device, channel estimation according to the linear feature and the nonlinear feature.

20 Claims, 12 Drawing Sheets

(51) Int. Cl.
*H04L 25/02* (2006.01)
*H04W 72/232* (2023.01)

(56) References Cited

FOREIGN PATENT DOCUMENTS

| | | | |
|---|---|---|---|
| CN | 111555990 | A | 8/2020 |
| CN | 112398505 | A | 2/2021 |
| WO | 2020199066 | A1 | 10/2020 |

OTHER PUBLICATIONS

First Office Action issued in related Chinese Application No. 202110546723.1 , mailed Aug. 29, 2023, 7 pages.
Ziyu Zhou et al.,“Analysis of the theoretical upper limit of uplink spectrum efficiency based on superimposed pilots in cell-free massive MIMO systems”, Signal Processing, vol. 37, Issue 4, Apr. 30, 2021, ISSN:1003-0530.

* cited by examiner

CHANNEL ESTIMATION METHOD AND APPARATUS, DEVICE, AND READABLE STORAGE MEDIUM

CROSS-REFERENCE TO RELATED APPLICATIONS

This application is a continuation of International Application No. PCT/CN2022/092497, filed May 12, 2022, which claims priority to Chinese Patent Application No. 202110546723.1, filed May 19, 2021. The entire contents of each of the above-referenced applications are expressly incorporated herein by reference.

TECHNICAL FIELD

The present application relates to the technical field of communication, and in particular relates to a channel estimation method and apparatus, a device, and a readable storage medium.

BACKGROUND

Signal reception first needs to accurately estimate a wireless channel according to a Demodulation Reference Signal (DM-RS). Channel estimation can be accomplished through a traditional Minimum Mean Square Error (MMSE) algorithm. However, the problem is that wireless channel estimation needs to be supported by a large amount of DM-RS overheads.

SUMMARY

Embodiments of the present application provide a channel estimation method and apparatus, a device, and a readable storage medium.

In a first aspect, a channel estimation method is provided, including: receiving, by a communication device, a pilot signal and a data signal; determining, by the communication device, a linear feature according to the pilot signal; determining, by the communication device, a nonlinear feature according to the data signal; and performing, by the communication device, channel estimation according to the linear feature and the nonlinear feature.

In a second aspect, a channel estimation apparatus is provided, including: a receiving module, configured to receive a pilot signal and a data signal; a first determining module, configured to determine a linear feature according to the pilot signal; a second determining module, configured to determine a nonlinear feature according to the data signal; and a channel estimation module, configured to perform channel estimation according to the linear feature and the nonlinear feature.

In a third aspect, a communication device is provided, including: a processor, a memory, and a program stored in the memory and executable on the processor, and when the program is executed by the processor, the steps of the method according to the first aspect are performed.

In a fourth aspect, a communication device is provided, including a processor and a communication interface, where the processor is configured to implement the steps of the method according to the first aspect.

In a fifth aspect, a readable storage medium is provided. The readable storage medium stores a program or an instruction, and the program or the instruction is executed by a processor to implement the steps of the method according to the first aspect.

In a sixth aspect, a computer program/program product is provided, the computer program/program product is stored in a non-volatile storage medium, and the computer program/program product is executed by at least one processor to implement the steps of the processing method according to the first aspect.

In a seventh aspect, a chip is provided, the chip includes a processor and a communication interface, the communication interface is coupled to the processor, and the processor is used to run programs or instructions, so as to implement the processing method according to the first aspect.

In an eighth aspect, a communication device is provided, configured to execute steps of the method according to the first aspect.

In the embodiment of the present application, the communication device determines the linear feature according to the pilot signal, and determines the nonlinear feature according to the data signal, and performs channel estimation through the linear feature and the nonlinear feature, which can effectively reduce pilot signal (or reference signal) overheads of channel estimation while ensuring the channel estimation performance.

DETAILED DESCRIPTION

The following clearly describes technical solutions in embodiments of the present application with reference to accompanying drawings in the embodiments of the present application. Apparently, the described embodiments are some but not all of the embodiments of the present application. All other embodiments obtained by a person of ordinary skill in the art based on the embodiments of the present application shall fall within the protection scope of the present application.

The terms "first", "second", and the like in the specification and claims of the present application are used to distinguish between similar objects instead of describing a designated order or sequence. It should be understood that, the terms used in such a way is interchangeable in proper circumstances, so that the embodiments of the present application can be implemented in an order other than the order illustrated or described herein. Objects classified by "first" and "second" are usually of a same type, and the number of objects is not limited. For example, there may be one or more first objects. In addition, "and" in the specification and claims represents at least one of connected objects. Symbol "I" generally represents an "or" relationship between associated objects.

It should be noted that, the technologies described in the embodiments of the present application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of the present application may be used interchangeably. The technologies described can be applied to both the systems and the radio technologies mentioned above as well as to other systems and radio technologies. A New Radio (NR) system is described in the following description for illustrative purposes, and the NR terminology is used in most of the following description, although these technologies can also be applied to applications other than the NR system application, such as the $6^{th}$ Generation (6G) communications system.

In order to facilitate the understanding of the embodiments of the present application, the following technical points are introduced first:

1. DM-RS Signal

Figure 1:
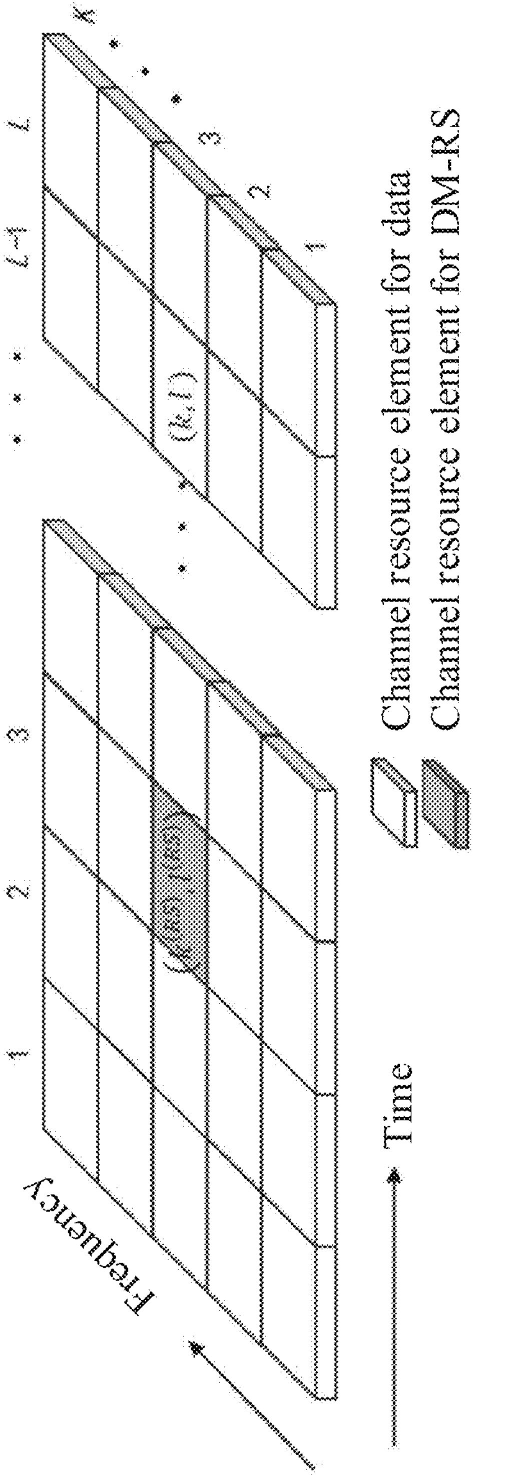
FIG. 1 is a schematic diagram of receiving a signal in an ODFM system.

In an additive Gaussian white noise Orthogonal Frequency Division Multiplexing (OFDM) system, as shown in FIG. 1, a receiving signal on an $n^{th}$ receive antenna on the $(k, l)^{th}$ Resource Element (RE) can be expressed as:

$$r_n(k, l) = \sqrt{E_s} \sum_{m=1}^{M} h_{m,n}(k, l) e^{\alpha_{m,n}(k,l)} \cdot s_m(k, l) + \eta_n(k, l)$$

$s_m(k, l)$ is a data signal on a $(k, l)^{th}$ RE on an $m^{th}$ transmit antenna, or a pilot signal used for channel estimation, a resource element thereof is located in K×L time-frequency domain. $E_s$ is transmit energy of the data signal or the pilot signal, M is a total number of transmit antennas, $h_{m,n}(k, l)$ and $\alpha_{m,n}(k, l)$ are a channel amplitude and a channel phase on a $(k, l)^{th}$ RE on the $m^{th}$ transmit antenna and the $n^{th}$ receive antenna, $\eta_n(k, l)$ is Additive white Gaussian noise (AWGN) received on a $(k, l)^{th}$ RE on the $n^{th}$ receive antenna, the average value is zero and noise power spectral density is $N_0$, and m=1, . . . , M, as shown in FIG. 1.

For simplicity, it is assumed that $s_m(k, l)$ is a data symbol with Quadrature Phase Shift Keying (QPSK) modulation, k and l are time domain and frequency domain indexes and are in K×L time domain and frequency domain, $|s_m(k, l)|=1$, $s_m(k^{RS}, l^{RS})$ is a QPSK modulated DM-RS pilot signal, and $k^{RS}$ and $l^{RS}$ are time domain and frequency domain indexes and are also in K×L time domain and frequency domain. In addition, the antenna is configured according to 1×N Single-Input Multiple-Output (SIMO), and therefore m=1. However, it can be easily extended to the general Multiple-Input Multiple-Output (MIMO) case.

2. DM-RS Algorithm Based on the Classic Deep Neural Networks (DNN)

Figure 2:
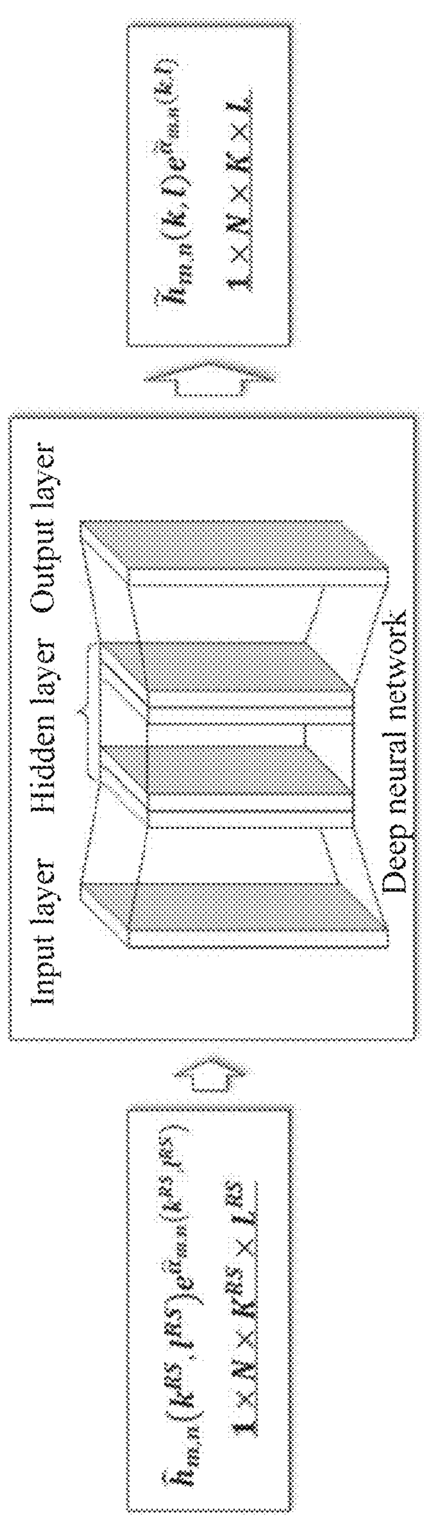
FIG. 2 is a schematic diagram of a DMRS algorithm of a deep neural network.

$\hat{h}_{m,n} e^{\hat{\alpha}_{m,n}}(k^{RS}, l^{RS})$ is a pilot channel element derived from $s(k^{RS}, l^{RS})$ according to the traditional method of the least square (LS) algorithm, and its related matrix is $K^{RS} \times L^{RS}$ matrix. Herein, $\hat{h}_{m,n}(k^{RS}, l^{RS}) e^{\hat{\alpha}_{m,n}(k^{RS}, l^{RS})}$ is used as the input feature of the DNN neural network. $\tilde{h}_{m,n}(k, l) e^{\tilde{a}_{m,n}(k,l)}$ is the output of the DNN neural network and is a channel element of the K×L matrix of the estimated channel in time and frequency space. As shown in FIG. 2, the dimension of the input feature is $1 \times N \times K^{RS} \times L^{RS}$, w % bile the dimension of the neural network output is 1×N×K×L. In the pilot design, we hope to reduce the pilot dimension as much as possible, so as to reduce the pilot overheads in the OFDM system. It is worth noting that since the input feature values are usually real numbers during the DNN training process, the received complex signal must be converted into a real number, that is, the input dimension is multiplied by 2. For example, when the output dimension is 1×N×K×L, the converted output dimension is 2×1×N×K×L.

The latest research on Artificial Intelligence (AI) proves that neural networks use function approximators and use convolutional neural networks (CNN) or use recurrent neural networks (RNN) and other algorithms, and can significantly improve the algorithm learning ability. Since the execution of DNN can be highly parallelized on the concurrent architecture, and low-precision data types can be used to realize the learning of neural networks. Therefore, the adoption of this form of learning algorithm has great expectations for the improvement of the receiving performance of the wireless physical channel.

The DM-RS algorithm of the classical neural network generally first collects the DM-RS samples in the time domain and frequency domain of OFDM, and then filters through the traditional method of the least square (LS) algorithm, and finally serves as the training feature of the DNN to train DNN. In this method, when the density of DM-RS and the corresponding signal-to-noise ratio (SNR) are relatively high, the gain achieved by DNN is more obvious. However, when the density of DM-RS is relatively sparse and the corresponding SNR is relatively low, the performance improvement is relatively limited. Therefore, in order to improve the accuracy of channel estimation, the input of training features can be increased by increasing the DM-RS overheads. This will have very limited improvement in overall system performance.

Figure 3:
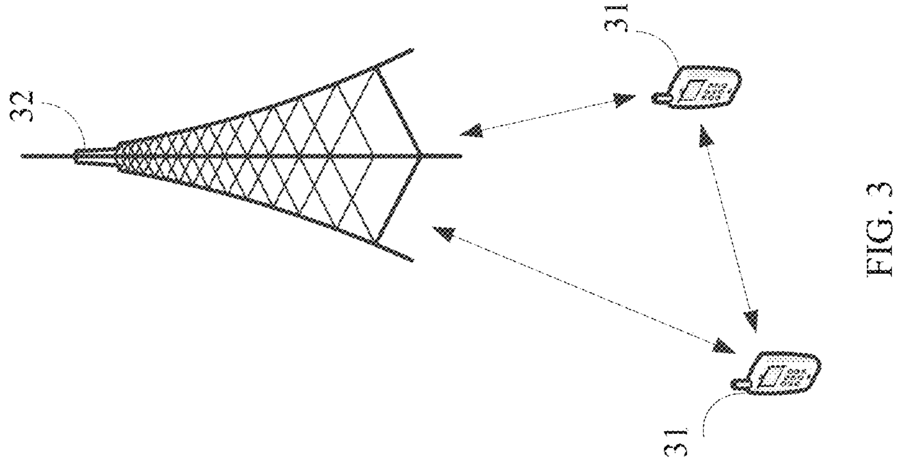
FIG. 3 is a schematic diagram of a wireless communication system to which an embodiment of the present application is applicable.

Referring to FIG. 3, FIG. 3 is a block diagram of a wireless communications system to which embodiments of the present application can be applied. The wireless communication system includes a terminal 31 and a network side device 32. The terminal 31 may also be called a terminal device or User Equipment (UE), and the terminal 31 may be a mobile phone, a tablet computer, a laptop computer or a notebook computer, a personal digital Assistant (PDA), a palmtop computer, a netbook, an ultra-mobile personal computer (UMPC), a mobile Internet device (MID), a wearable device or a vehicle-mounted device (VUE), a pedestrian terminal (PUE), and other terminal side devices. The wearable device includes: smart watches, bracelets, earphones, glasses, etc. It should be noted that a specific type of the terminal 31 is not limited in the embodiments of the present application.

The network side device 32 may be a base station or a core network. The base station may be referred to as a node B, an evolved node B, an access point, a base transceiver station (BTS), a radio base station, a radio transceiver, a basic service set (BSS), an extended service set (ESS), a node B, an evolved node B (for example, gNB), a home node B, a home evolved node B, a wireless local area network (WLAN) access point, a wireless fidelity (WiFi) node, a transmitting receiving point (TRP), a wireless access network node, or other appropriate terms in the art. As long as a same technical effect is achieved, the base station is not limited to a specified technical term. It should be noted that, in embodiments of the present application, only a base station in the NR system is used as an example, but a specific type of the base station is not limited.

Figure 4:
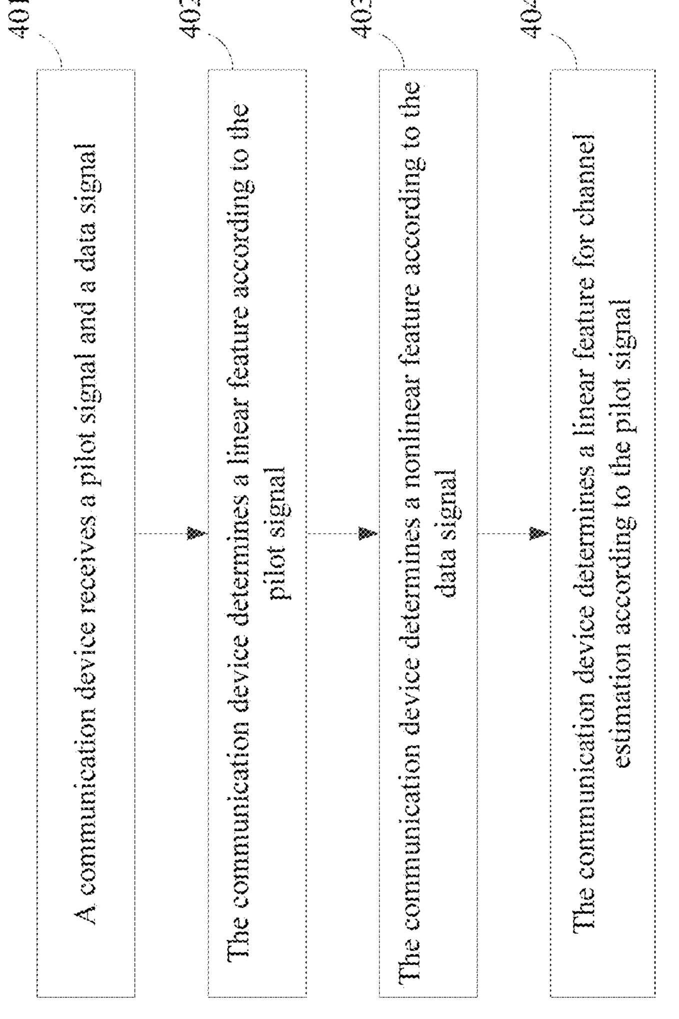
FIG. 4 is a schematic diagram of a channel estimation method provided by an embodiment of the present application.

Referring to FIG. 4, the embodiment of the present application provides a channel estimation method, and the steps include: step 401 and step 402.

Step 401: A communication device receives a pilot signal and a data signal.

In the embodiment of the present application, the pilot signal includes: a Demodulation Reference Signal (DM-RS), a Phase-tracking reference signals (PT-RS), a CSI reference signal (CSI-RS), or a Sounding reference signal (SRS), etc.

Step 402: The communication device determines a linear feature according to the pilot signal.

Step 403: The communication device determines a nonlinear feature according to the data signal.

Exemplarily, the nonlinear feature is the amplitude feature of the data signal, and does not include the amplitude feature of the pilot signal.

Step 404: The communication device performs channel estimation according to the linear feature and the nonlinear feature.

It can be understood that the communication device (or receiver) mentioned above may be a terminal or a network side device, such as a base station.

The linear feature is composed of the amplitude and phase of the channel from each transmit antenna to each receive antenna; and the nonlinear feature is composed of the sum of squares of the phases from multiple transmit antennas to each receive antenna. It is worth noting that in the case of SIMO, the nonlinear feature obtained from the data signal is reflected as a linear feature.

It should be noted that features such as amplitude features (or power features) and phase features can be obtained from pilot signals, and amplitude features (or power features) can be obtained from data signals. It is worth noting that the amplitude feature and the power feature are equivalent, and their relationship is that the power feature is equal to the square of the amplitude feature.

In the embodiment of the present application, the step of performing channel estimation by the communication device according to the linear feature and the nonlinear feature includes:

performing, by the communication device, channel estimation through Artificial Intelligence (AI) according to the linear feature and the nonlinear feature, that is, the linear feature and the nonlinear feature are used as input information of the AI algorithm, and after the AI algorithm operation, the channel estimation result is output.

In the embodiment of the present application, the step of determining the nonlinear feature according to the data signal by the communication device includes:

in a case of MIMO, determining, by the communication device, the nonlinear feature according to the data signal by training a neural network.

In the embodiment of the present application, the step of receiving the pilot signal and the data signal by the communication device includes:

receiving, by the communication device, the pilot signal and the data signal via a resource element.

In this embodiment of the present application, the step of determining the nonlinear feature by the communication device according to the data signal by training a neural network includes: training, by the communication device according to the pilot signal and the data signal, a nonlinear feature associated with each resource element; and training, by the communication device by using the trained nonlinear feature and the pilot signal, a channel associated with each resource element.

Taking the nonlinear feature as the amplitude feature of the data signal as an example, the estimation of the amplitude feature depends on the training of DNN. Amplitude feature-related DNN training can be divided into two training stages: one is to first train, according to the received pilot signal and data signal, the amplitude associated with each resource element, and the other is to train a channel of each resource element by using the trained amplitude feature and the received pilot signal. The two training stages are connected in series through different DNNs.

In the embodiment of the present application, the step of determining the nonlinear feature according to the data signal by the communication device includes:

performing, by the communication device, de-noising processing on the data signal; and determining, by the communication device, the nonlinear feature by using the denoised data signal.

In this embodiment of the present application, the step of the communication device performing de-noising processing on the data signal includes: determining, by the communication device, a de-noising channel block: and performing, by the communication device, de-noising processing on the data signal by using the noise reduction channel block. For example, in the process of obtaining nonlinear features, the communication device averages received data signals by setting the noise reduction channel block to reduce noise, thereby obtaining accurate nonlinear features, such as amplitude features.

In the embodiment of the present application, when the nonlinear feature includes the amplitude feature of the data signal, the step of determining the nonlinear feature by the communication device by using the denoised data signal includes: obtaining, by the communication device, a sum of square values of amplitudes of all transmit antennas: and determining, by the communication device, the sum of the square values of the amplitudes as the amplitude feature of the denoised data signal. MIMO channel estimation is realized according to the pilot feature and the amplitude feature and AI-based methods.

In the embodiment of the present application, the step of determining the noise reduction channel block by the communication device includes: determining, by the communication device, the noise reduction channel block according to one or more of a manner of receiving a signal, channel fading frequency selectivity, and a moving speed of the communication device: where the manner of receiving a signal includes: receiving a signal in different consecutive time slots, or receiving a signal in an independent time slot, effectively reducing the impact of noise on nonlinear feature obtaining.

In the embodiment of the present application, when the communication device is a terminal, the method further includes: receiving downlink control information; and determining the manner of receiving a signal according to the downlink control information.

In the embodiment of the present application, before the step of determining, by the communication device, the size of the noise reduction channel block, the method further includes: determining, by the communication device, the channel fading frequency selectivity and/or the moving speed of the communication device.

In the embodiment of the present application, the step of performing de-noising processing on the data signal by the communication device includes: obtaining, by the communication device, a measured Reference Signal Receiving Power (RSRP) and/or a Received Signal Strength Indication (RSSI); determining, by the communication device, a noise power spectral density according to the RSRP and/or RSSI: performing de-noising processing on the data signal according to the noise power spectral density. Subtraction is performed on average received data signal power based on the noise power spectral density to optimize nonlinear feature de-noising, making the nonlinear feature more accurate.

In the embodiment of the present application, the communication device determines the linear feature according to the pilot signal, and determines the nonlinear feature according to the data signal, and performs channel estimation through the linear feature and the nonlinear feature, which can effectively reduce reference signal (or pilot signal) overheads of channel estimation while ensuring the channel estimation performance.

In the following, the performance enhancement of DM-RS channel estimation by adopting pilot and data-aided and AI-based method is introduced as an example.

The dimension of the feature input layer is increased in the neural network to improve the reliability of channel estimation in the output layer: in addition, the feature as a new dimension can be signal amplitude (Envelop) received from DM-RS and data, that is, $\hat{h}_{m,n}(k, l)$, and the amplitude time and frequency space are K×L. The amplitude can be calculated by the following formula:

$$\hat{h}_{m,n}(k, l) = \frac{|r_n(k, l)|}{\sqrt{E_s}} = \left| h_{m,n}(k, l)e^{\alpha_{m,n}(k,l)} \cdot s(k, l) + \frac{\eta_n(k, l)}{\sqrt{E_s}} \right|$$

where $k = 1, 2, \ldots, K$, and $l = 1, 2, \ldots, L$.

For simplicity, it is assumed that $s_m(k, l)$ is a data symbol with QPSK modulation, k and l are time domain and frequency domain indexes and are in K×L time domain and frequency domain, $|s_m(k, l)|=1$, $s_m(k^{RS}, l^{RS})$ is a QPSK modulated DM-RS pilot signal, and $k^{RS}$ and $l^{RS}$ are time domain and frequency domain indexes and are also in K×L time domain and frequency domain. Additionally, the antenna is configured according to SIMO of 1×N, and therefore m=1. However, it can be easily extended to the general MIMO case.

Thus, the amplitude $\hat{h}_{m,n}(k, l)$ can be further denoised by averaging the received signals in time and/or frequency domain. Here, we consider a de-noising channel block, the received signals in the de-noising channel block are averaged, such that the impact of noise on the amplitude estimation is minimized. If the de-noising channel block size is $(2K^{(av)}+1)\times(2L^{(av)}+1)$, the averaged amplitude $\bar{h}_{m,n}(k, l)$ can be expressed as:

$$\bar{h}_{m,n}(k, l) = \frac{1}{\sqrt{E_s}} \sqrt{\frac{1}{\left(2K^{(av)}+1\right)\times\left(2L^{(av)}+1\right)} \sum_{p=k-K^{(av)}}^{k+K^{(av)}} \sum_{q=l-L^{(av)}}^{l+L^{(av)}} |r_n(p, q)|^2 - N_0}$$

where $r_n(p, q)$ is the received signal on the $(p, q)^{th}$ RE on the $n^{th}$ receive antenna.

It should be noted that the value of $N_0$ can usually be obtained in the receiver by obtaining the measured RSRP and RSSI Besides, $r_{m,n}(p, q)$ can be decomposed as:

$$|r_n(p, q)|^2 = \underbrace{h_{m,n}^{(2}(p, q)}_{Constant} + \underbrace{|\eta_n(p, q)|^2}_{N_0 \text{ if taking average}} \underbrace{\begin{matrix} h_{m,n}(p, q)e^{\alpha_{m,n}(p,q)} \cdot s(p, q) \cdot \eta_n^*(p, q) + \\ h_{m,n}(p, q)e^{-\alpha_{m,n}(p,q)} \cdot s^*(p, q) \cdot \eta_n(p, q) \end{matrix}}_{\text{Zero if taking average from enough REs}}$$

Therefore, when the size of the de-noising channel block is large enough, $|r_n(p, q)|^2$ can be approximated and simplified as:

$$r_n(p,q) \approx h_{m,n}(p,q).$$

$h_{m,n}(p, q)$ is the amplitude on the (p, q) RE.

This means that the accuracy of the amplitude depends on the accuracy of the noise measurement and the size of the noise reduction channel block.

How to determine the noise reduction channel block to average the received signal in time domain and/or frequency domain needs to be considered. In wireless communication, the received signals may be received in consecutive time slots or in independent time slots. For example, the base station sends signals to different users at different times and spectrum resources through a time division method. If the base station continuously sends signals on more than two time slot resources, the receiver obtains the information of the data signal resources by demodulating the Downlink Control Information (DCI), and then decodes the continuous time slot signals, but if the base station only transmits a signal on one time slot resource, the receiver decodes the time slot signal of a single signal. Therefore, two cases need to be considered in determining the noise reduction channel block.

Case 1: The receiver receives signals in consecutive time slots.

Case 2: The receiver receives the signal in an independent time slot. For different cases, the noise reduction channel blocks are different. In the former case, the noise reduction channel block can be set across slots, while in the latter case, the noise reduction channel block can only be set in independent time slots.

It should be noted that the pilot signal in the embodiment of the present application is not only a DM-RS, and other Reference Signal (RS) can be used to effectively estimate the channel. Examples are a Phase-tracking reference signals (PT-RS), a CSI reference signal (CSI-RS), a Sounding reference signal (SRS), etc.

In the case of SIMO, the amplitude feature information can be obtained by estimating $N_0$ and setting the noise reduction channel block. However, in the case of MIMO, the amplitude information of each signal sent from multiple transmit antennas cannot be obtained independently. In this case, the receiver can only obtain the sum of the squared values of the amplitudes for multiple transmit antennas, that is, the received amplitude on the $n^{th}$ receive antenna is approximately simplified as:

$$r_n(p, q) = \sqrt[2]{\sum_{m=1}^{M} h_{m,n}^2(p, q)}$$

$h_{m,n}(p, q)$ is the amplitude on the (p, q) RE.

It should be noted that in traditional channel estimation methods, the sum of square values of amplitudes cannot be separated, that is, the information of the sum of square values of nonlinear amplitudes is not useful. However, with DNN, the information of the sum of square values of amplitudes can be considered as an effective new input feature, thereby improving the performance of channel estimation.

Figure 5:
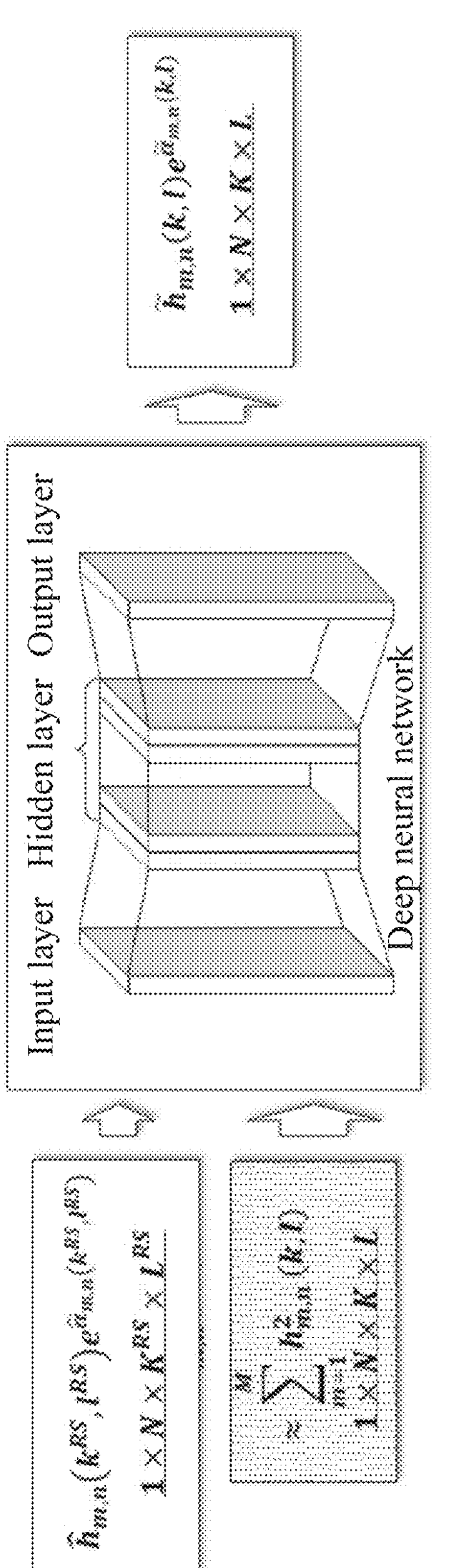
FIG. 5 is a first schematic diagram of a DMRS algorithm of a deep neural network provided by an embodiment of the present application.

As shown in FIG. 5, the input feature consists of two parts. The first part is to use the traditional method of Least Square to derive the pilot channel element, and its output feature dimension is $M \times N \times K^{RS} \times L^{RS}$, which is used as the input feature of the first part. The second part is to use the method of estimating $N_0$ and setting the noise reduction channel block to obtain the amplitude feature information, and the output dimension is $1 \times N \times K \times L$, which is used as the input feature for the second part. In the pilot design, the dimension of the pilot is reduced as much as possible by adding new amplitude feature information, thereby reducing the pilot overheads required in the OFDM system, and at the same time greatly improving the overall performance of the system.

In amplitude feature estimation, the de-noising channel block can be determined first, and the channel block depends on the channel fading frequency selectivity and the moving speed of the receiver. However, these two parameters are usually not known in advance. Therefore, it is very difficult to correctly select the optimal length and width of the noise reduction channel block. If the de-noising channel block is too large, the true amplitude feature information will be over-filtered. If the noise reduction channel block is too small, the noise reduction effect will be very limited.

In addition, the amplitude feature estimation also requires the receiver to estimate the noise power spectral density as $N_0$ through RSRP and RSSI. If the interference noise is added, the power estimation of the interference noise is more difficult. The noise reduction effect may be greatly impacted.

Herein, it is considered that the estimation of the amplitude feature also relies on the training of the DNN. DNN training can be divided into two training stages: one is to first train, according to the received pilot signal and data signal, the amplitude feature of each resource element, and the other is to train a channel on each resource element by using the trained amplitude feature and the received pilot signal. The two training stages are implemented by different DNNs, and are sequentially connected in series.

Figure 6:
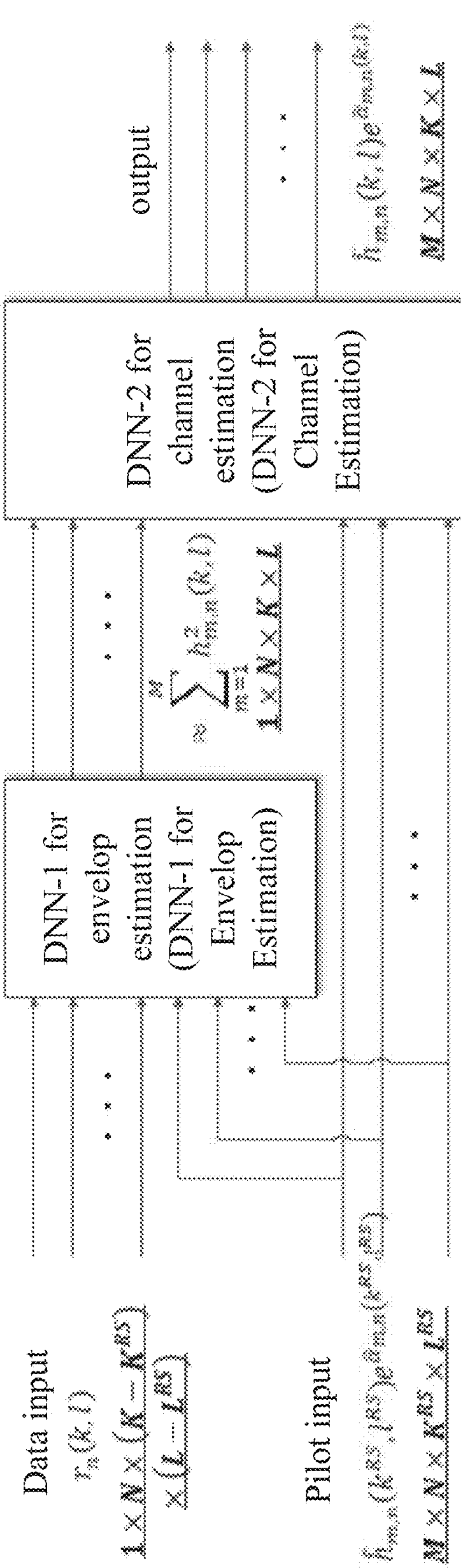
FIG. 6 is a second schematic diagram of a DMRS algorithm of a deep neural network provided by an embodiment of the present application.

As shown in FIG. 6, the DNN-1 input for amplitude feature training consists of two parts; the first part is to use the pilot signal to derive the amplitude of the pilot channel, and its input feature dimension is $M \times N \times K^{RS} \times L^{RS}$, which is used as the input feature of the first part. The second part is to use the data signal and use the Least Square filtering method to derive the channel elements related to the amplitude, and its input dimension is $1 \times N \times (K-K^{RS}) \times (L-L^{RS})$, which is used as the input feature of the second part. The DNN-1 neural network of the amplitude feature training trains and outputs the sum of the square values of the amplitudes of multiple transmit antennas after de-noising, and its output dimension is $1 \times N \times K \times L$.

In addition, the DNN-2 input is also composed of two parts. The first part is the output part of the DNN-1 neural network, which is used as the input feature of DNN-2, and its input dimension is $1 \times N \times K \times L$. The second part of DNN-2 uses the same pilot signal as the input of the first part of DNN-1 as the input feature, that is, the Least Square method is used to derive the pilot channel feature, and its input feature dimension is $M \times N \times K^{RS} \times L^{RS}$. Finally, the DNN-2 neural network trains and outputs estimated channel related to M transmit antennas and N receive antennas after de-noising and interpolation, and its output dimension is $M \times N \times K \times L$.

Similarly, In the pilot design, the dimension of the pilot is reduced as much as possible by adding new amplitude feature information, thereby reducing the pilot overheads required in the OFDM system, and at the same time greatly improving the overall performance of the system.

It is worth noting that, similar to amplitude features, power features can also be obtained by setting noise reduction channel blocks or through DNN training. Power features can be used as DNN input for channel estimation to improve the overall performance of channel estimation.

In the embodiment of the present application, for SIMO or MIMO channel estimation, new input features of DNN can be added by adopting pilot and data-aided and AI-based methods, and DNN can be used to estimate channels more effectively. Compared with the existing DM-RS algorithm of the classical neural network, the embodiment of the present application adds a new amplitude feature on the basis of the pilot feature, so that the DNN input features are more abundant, and the overhead of the DM-RS pilot can be reduced, and at the same time, the gain of channel estimation can also be improved.

The traditional data-aided decision feedback channel estimation (DFCE) method cannot use the information of the sum of the square values of the amplitudes. However, the embodiment of the present application utilizes the nonlinear inherent feature of DNN, and further uses the sum of the square values of the amplitudes as the new input feature of DNN, thereby greatly reducing the overheads of DM-RS pilots, and at the same time accurately estimating the wireless channel.

The estimation of the amplitude feature can be realized by setting the noise reduction channel block, and can also be realized more effectively through the independent DNN neural network. The latter can be realized by sequentially connecting different DNNs in series in the two training stages and then performing training, to achieve better channel estimation results.

The following describes the embodiment of the present application in combination with Embodiment 1 and Embodiment 3.

Embodiment 1: SIMO Scenario

It is assumed that $s_m(k, l)$ is a data symbol with QPSK modulation, k and l are time domain and frequency domain indexes and are in $K \times L$ time domain and frequency domain, $|s_m(k, l)|=1$, $s_m(k^{RS}, l^{RS})$ is a QPSK modulated DM-RS pilot signal, and $k^{RS}$ and $l^{RS}$ are time domain and frequency domain indexes and are also in $K \times L$ time domain and frequency domain. Additionally, the antenna is configured according to SIMO of $1 \times N$, and therefore m=1.

Figure 7:
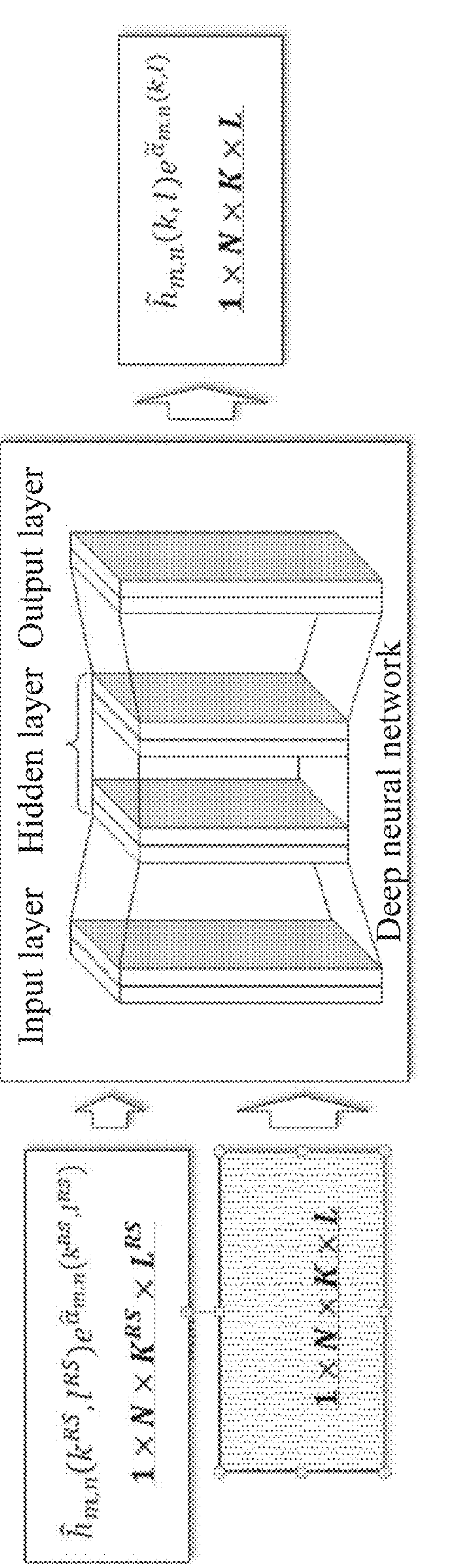
FIG. 7 is a third schematic diagram of a DMRS algorithm of a deep neural network provided by an embodiment of the present application.

As shown in FIG. 7, the input feature consists of two parts. The first part is to use the traditional method of LS to derive the pilot channel element, and its output feature dimension is $1 \times N \times K^{RS} \times L^{RS}$, which is used as the input feature of the first part. The second part is to use the method of estimating $N_0$ and setting the noise reduction channel block to obtain the amplitude feature information, and the output dimension is 1×N×K×L, which is used as the input feature for the second part. The DNN neural network trains and outputs estimated channel related to N receive antennas after de-noising and interpolation, and its output dimension is 1×N×K×L.

In the pilot design, the pilot overheads required in the OFDM system are reduced as much as possible by adding new amplitude feature information, and at the same time it greatly improves the overall performance of the system.

It should be noted that the DNN in the embodiment of the present application is a special case. At the receive end, other neural networks can also be effectively used. For example, recurrent neural networks, recurrent neural networks, and even other AI techniques that are not neural networks, such as support vector machines, are also feasible. In addition, terminals can have different neural networks. According to the wireless channel environment, the base station and the terminal exchange information to allow the terminal to select and use the best neural network. That is, based on that the base station has known knowledge of the corresponding wireless environment, the terminal can flexibly adapt to the wireless channel environment and estimate the channel effectively.

Embodiment 2

In amplitude feature estimation, the de-noising channel block can be determined first, and the size of the channel block depends on the channel fading frequency selectivity and the moving speed of the receiver. Before determining the noise reduction channel block, the receiver needs to have a rough estimate of the channel fading frequency selectivity and the moving speed. At the same time, information of receiving DCI is used to determine the continuity of time slots of receiving signals. The continuity of time slots can be divided into two cases; case 1 is that the receiver receives signals in consecutive time slots, and case 2 is that the receiver receives signals in independent time slots.

Figure 8:
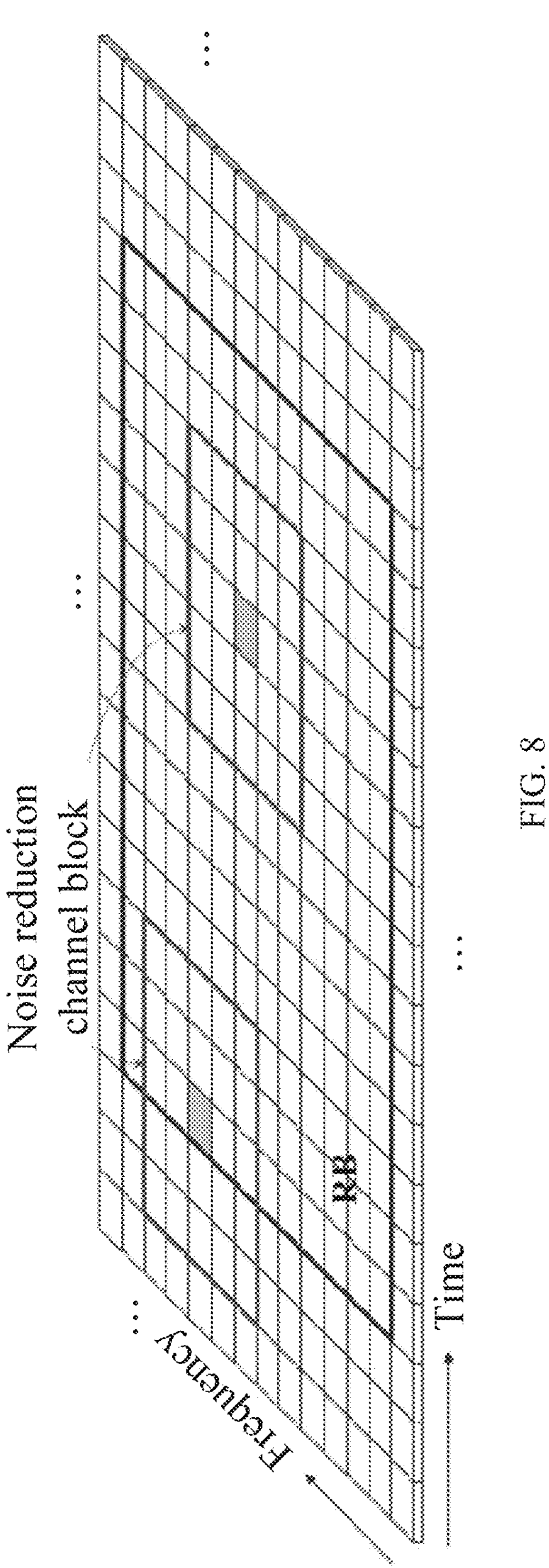
FIG. 8 is a first schematic diagram of determining a noise reduction channel block provided by an embodiment of the present application.

As shown in FIG. 8, in case 1, the receiver sets $K^{(av)}=L^{(av)}=2$ to determine the size of the noise reduction channel block, that is, the noise reduction channel block is 5×5.

Figure 9:
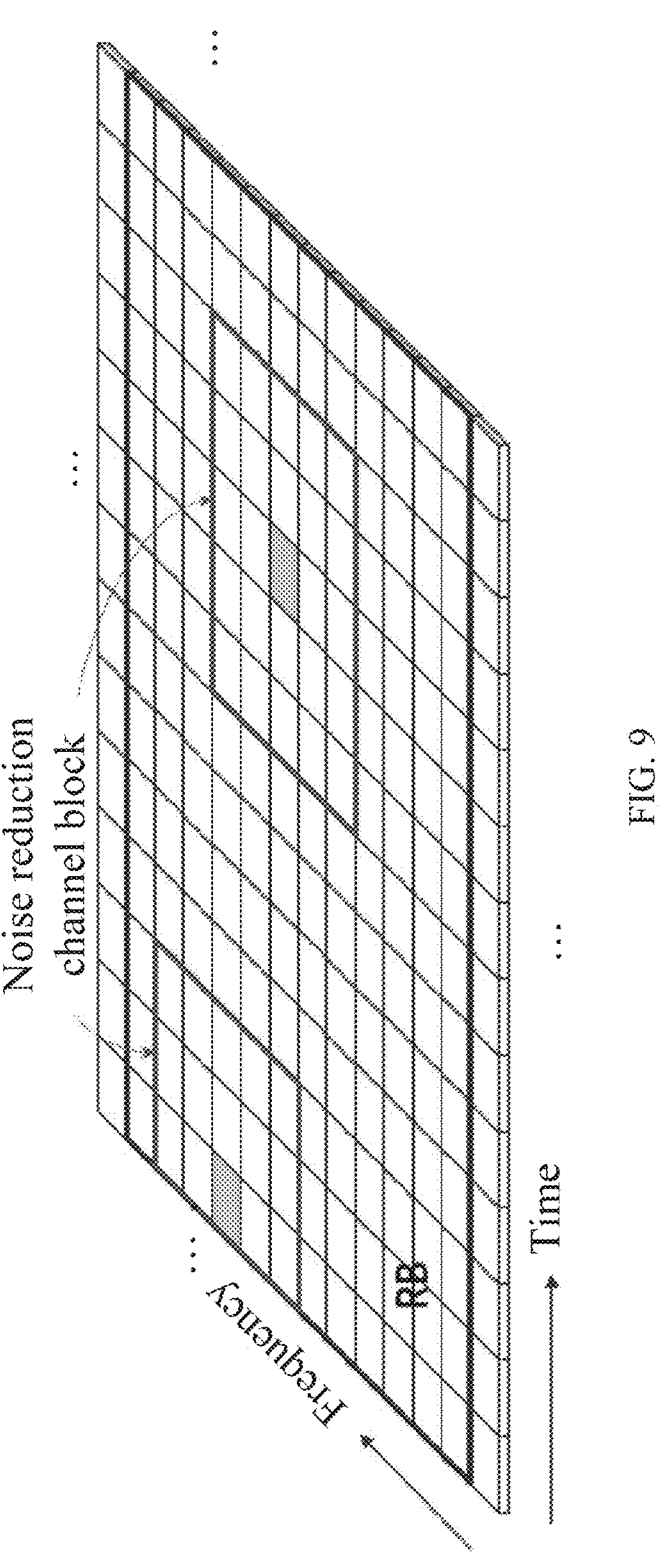
FIG. 9 is a second schematic diagram of determining a noise reduction channel block provided by an embodiment of the present application.

For case 2, as shown in FIG. 9, the receiver determines a setting parameter of the noise reduction channel block, $K^{(av)}=L^{(av)}=2$. However, in this case, the size of the noise reduction channel block is different according to the location of a channel estimation resource element. At the start location of the received signal, due to the independence of the slots of receiving signals, the size of the first noise reduction channel block is 3×5, while the size of the second noise-reduced channel block is 5×5.

Embodiment 3

In this example, it is simply assumed that it has 2×1 Multi Input Single Output (MISO), which can have any modulation method, that is, Quadrature Phase Shift Keying (QPSK), 16 Quadrature Amplitude Modulation (QAM), 64QAM, and 256QAM. The received signal can be expressed as:

$$r_1(k,l)\sqrt{E_s}\,h_{1,1}(k,l)e^{\alpha_{1,1}(k,l)}\cdot s_1(k,l) + \sqrt{E_s}\,h_{2,1}(k,l)e^{\alpha_{2,1}(k,l)}\cdot s_2(k,l) + \eta_1(k,l).$$

The amplitude of the received signal $r_1(k, l)$ in the first receive antenna can be calculated as.

$$\begin{aligned}\frac{|r_1(k,l)|^2}{E_s} &= \left|h_{1,1}(k,l)e^{\alpha_{1,1}(k,l)}\cdot s_1(k,l) + h_{2,1}(k,l)e^{\alpha_{2,1}(k,l)}\cdot s_2(k,l) + \frac{\eta_1(k,l)}{\sqrt{E_s}}\right|^2 = \\ &h_{1,1}^2(k,l)\cdot\underbrace{|s_1(k,l)|^2}_{1\ \text{if taking average}} + h_{2,1}^2(k,l)\cdot\underbrace{|s_2(k,l)|^2}_{1\ \text{if taking average}} + \\ &\underbrace{\frac{1}{E_s}|\eta_n(k,l)|^2}_{N_0\ \text{if taking average}} + h_{1,1}(k,l)e^{\alpha_{1,1}(k,l)}h_{2,1}(k,l)e^{-\alpha_{2,1}(k,l)}\cdot s_1^*(k,l)s_2(k,l) + \\ &\left(h_{1,1}(k,l)e^{\alpha_{1,1}(k,l)}\cdot s_1(k,l) + h_{2,1}(k,l)e^{\alpha_{2,1}(k,l)}\cdot s_2(k,l)\right)\frac{h_1^*(k,l)}{\sqrt{E_2}} + \\ &\left(h_{1,1}(k,l)e^{-\alpha_{1,1})(k,l)}\cdot s_1^*(k,l) + h_{2,1}(k,l)e^{-\alpha_{2,1}(k,l)}\cdot s_2^*(k,l)\right)\frac{\eta_1(k,l)}{\sqrt{E_2}}\end{aligned}$$

It is worth noting that the method of selecting noise reduction channel blocks to reduce noise is also used to average the above received signals. If the number of REs used to average is large enough, items other than the first three terms are all zero.

Thus, by taking the average of $|r_1(k, l)|^2$ on the noise reduction channel block with a size K×L, the amplitude of $r_1(k, l)$ can be approximated as:

$$\sqrt{\frac{1}{KL}\sum_{k,t}^{KL}\frac{|r_1(k,l)|^2}{E_s} - \frac{N_0}{E_s}} \approx \sqrt{h_{1,1}^2(k,l) + h_{2,1}^2(k,l)}$$

Therefore, unlike extracting a single amplitude in the case of SIMO, in the case of MIMO, the receiver can only obtain the sum of the square values of the amplitudes received from the two transmit antennas. However, based on the nonlinear inherent feature of DNN, the sum of the square values of the amplitudes can be used as a new effective feature for DNN input, and the output performance of DNN channel estimation is greatly improved.

It is worth noting that the estimation of the amplitude is sensitive to the modulation method, and in general, QPSK performance is the best. Other modulation methods, such as 16QAM, 64QAM and 256QAM, use different amplitudes for each OFDM symbol depending on the data signal. In order to improve the accuracy of amplitude estimation, we can use different modulation methods to modulate the data signal. That is, the data signal used for estimating the amplitude through the DNN can use QPSK, and other modulation methods can be purely used for data signal modulation.

Figure 10:
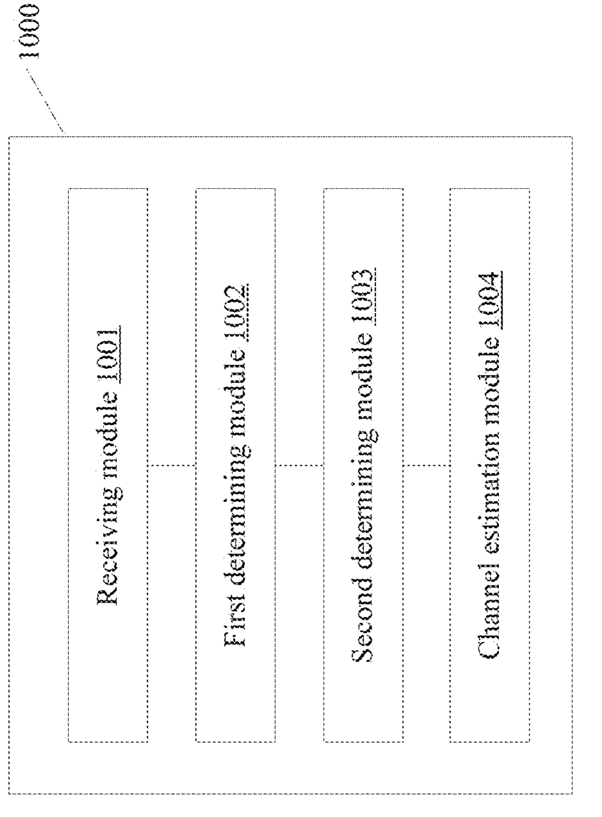
FIG. 10 is a schematic diagram of a channel estimation apparatus provided by an embodiment of the present application.

Referring to FIG. 10, an embodiment of the present application provides a channel estimation apparatus, which is applied to a communication device, and the apparatus 1000 includes:

a receiving module 1001, configured to receive a pilot signal and a data signal;

a first determining module 1002, configured to determine a linear feature according to the pilot signal;

a second determining module 1003, configured to determine a nonlinear feature according to the data signal; and a channel estimation module 1004, configured to perform channel estimation according to the linear feature and the nonlinear feature.

In an embodiment of the present application, the channel estimation module is further configured to: perform channel estimation through artificial intelligence according to the linear feature and the nonlinear feature.

In an embodiment of the present application, the second determining module is further configured to: in the case of MIMO, determine the nonlinear feature according to the data signal by training a neural network.

In an embodiment of the present application, the receiving module is further configured to receive the pilot signal and the data signal via a resource element.

In an embodiment of the present application, the second determining module is further configured to: train, according to the pilot signal and the data signal, a nonlinear feature related to each resource element: train, according to the trained nonlinear feature and the pilot signal, a channel associated with each resource element.

In an embodiment of the present application, the second determining module is further configured to: perform de-noising processing on the data signal: and determine the nonlinear feature by using the denoised data signal.

In an embodiment of the present application, the second determining module is further configured to: determine a noise reduction channel block: and perform de-noising processing on the data signal according to the noise reduction channel block.

In an implementation manner of the present application, the nonlinear feature includes: an amplitude feature of the data signal.

In an embodiment of the present application, the second determining module is further configured to; obtain a sum of squared values of amplitudes of all transmit antennas; and determine the sum of the square values of the amplitudes as the amplitude feature of the denoised data signal.

In an embodiment of the present application, the second determining module is further configured to: determine the noise reduction channel block according to one or more of a manner of receiving a signal, channel fading frequency selectivity, and a moving speed of the communication device:

The manner of receiving a signal includes: receiving a signal in different consecutive time slots, or receiving a signal in an independent time slot.

In an embodiment of the present application, the apparatus also includes:

a third determining module, configured to determine the channel fading frequency selectivity and/or the moving speed of the communication device.

In an embodiment of the present application, when the communication device is a terminal, the apparatus further includes:

a second receiving module, configured to receive downlink control information: and a fourth determining module, configured to determine a manner of receiving a signal according to the downlink control information.

In an embodiment of the present application, the second determining module is further configured to: obtain a measured RSRP and/or a RSSI; determine a noise power spectral density according to the RSRP and/or the RSSI; and perform de-noising processing on the data signal according to the noise power spectral density.

In an embodiment of the present application, the pilot signal includes: a demodulation reference signal, a phase tracking reference signal, a channel state information reference signal, or a sounding reference signal.

The apparatus provided in this embodiment of the present application can implement the processes implemented in the method embodiment shown in FIG. 4 and achieve a same technical effect. To avoid repetition, details are not described herein again.

The embodiment of the present application also provides a terminal, including a processor and a communication interface, where the communication interface is configured to receive a pilot signal and a data signal, and the processor is used to perform channel estimation according to the pilot signal and the data signal. This terminal embodiment corresponds to the foregoing method embodiment on the terminal side. Each implementation process and implementation of the foregoing method embodiment may be applicable to this terminal embodiment, and a same technical effect can be achieved.

Figure 11:
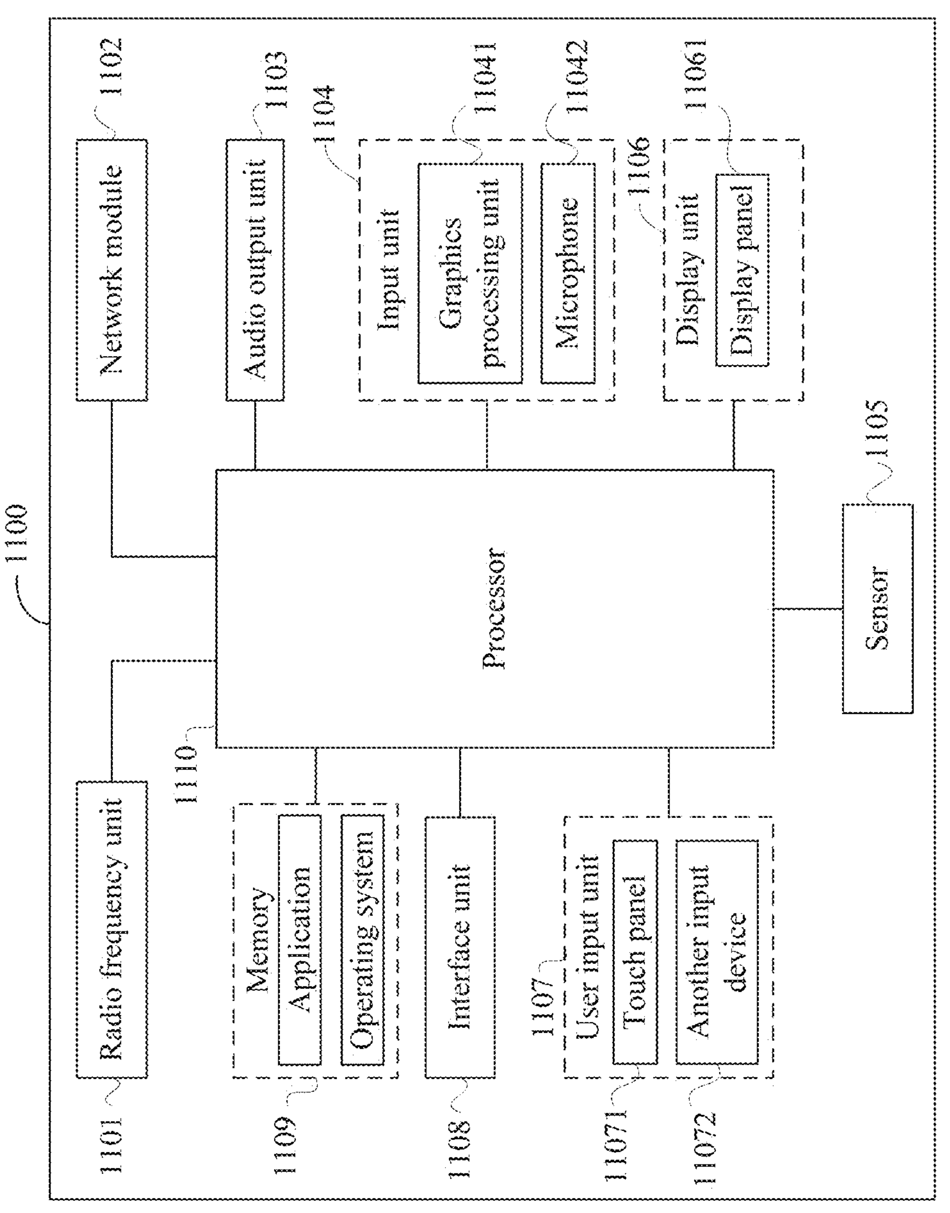
FIG. 11 is a schematic diagram of a terminal according to an embodiment of the present application.

FIG. 11 is a schematic diagram of a hardware structure of a terminal implementing an embodiment of the present application. The terminal 1100 includes, but is not limited to, at least some components of a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art can understand that the terminal 1100 may further include a power supply (such as a battery) that supplies power to each component. The power supply may be logically connected to the processor 1110 by using a power supply management system, to implement functions such as charging and discharging management, and power consumption management by using the power supply management system. The terminal structure shown in FIG. 11 constitutes no limitation on the terminal, and the terminal may include more or fewer components than those shown in the figure, or combine some components, or have different component arrangements. Details are not described herein.

It should be understood that, in this embodiment of the present application, the input unit 1104 may include a Graphics Processing Unit (GPU) 11041 and a microphone 11042, and the graphics processing unit 11041 processes image data of a still picture or a video obtained by an image capture apparatus (such as a camera) in a video capture mode or an image capture mode. The display unit 1106 may include a display panel 11061. In some embodiments, the display panel 11061 may be configured in a form such as a liquid crystal display or an organic light-emitting diode. The user input unit 1107 includes a touch panel 11071 and another input device 11072. The touch panel 11071 is also referred to as a touchscreen. The touch panel 11071 may include two parts: a touch detection apparatus and a touch controller. The another input device 11072 may include but is not limited to a physical keyboard, a functional button (such as a volume control button or a power on/off button), a trackball, a mouse, and a joystick. Details are not described herein.

In this embodiment of the present application, the radio frequency unit 1101 receives downlink data from a network side device and then sends the downlink data to the processor 1110 for processing; and sends uplink data to the network side device. Usually, the radio frequency unit 1101 includes but is not limited to an antenna, at least one amplifier, a transceiver, a coupler, a low noise amplifier, a duplexer, and the like.

The memory 1109 may be configured to store a software program or an instruction and various data. The memory 1109 may mainly include a program or instruction storage area and a data storage area. The program or instruction storage area may store an operating system, and an application or an instruction required by at least one function (for example, a sound playing function or an image playing function). In addition, the memory 1109 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 1110 may include one or more processing units. In some embodiments, an application processor and a modem processor may be integrated into the processor 1110. The application processor mainly processes an operating system, a user interface, an application, an instruction, or the like. The modem processor mainly processes wireless communication, for example, a baseband processor. It can be understood that, the modem processor may not be integrated into the processor 1110.

The terminal provided in this embodiment of the present application can implement the processes implemented in the method embodiment shown in FIG. 4, and achieve a same technical effect. To avoid repetition, details are not provided herein again.

The embodiment of the present application also provides a network side device, including a processor and a communication interface, where the communication interface is configured to receive a pilot signal and a data signal; and the processor is configured to perform channel estimation according to the pilot signal and the data signal. This network side device embodiment corresponds to the foregoing method embodiment on the network side device. Each implementation process and implementation of the foregoing method embodiment may be applicable to this network side device embodiment, and a same technical effect can be achieved.

Figure 12:
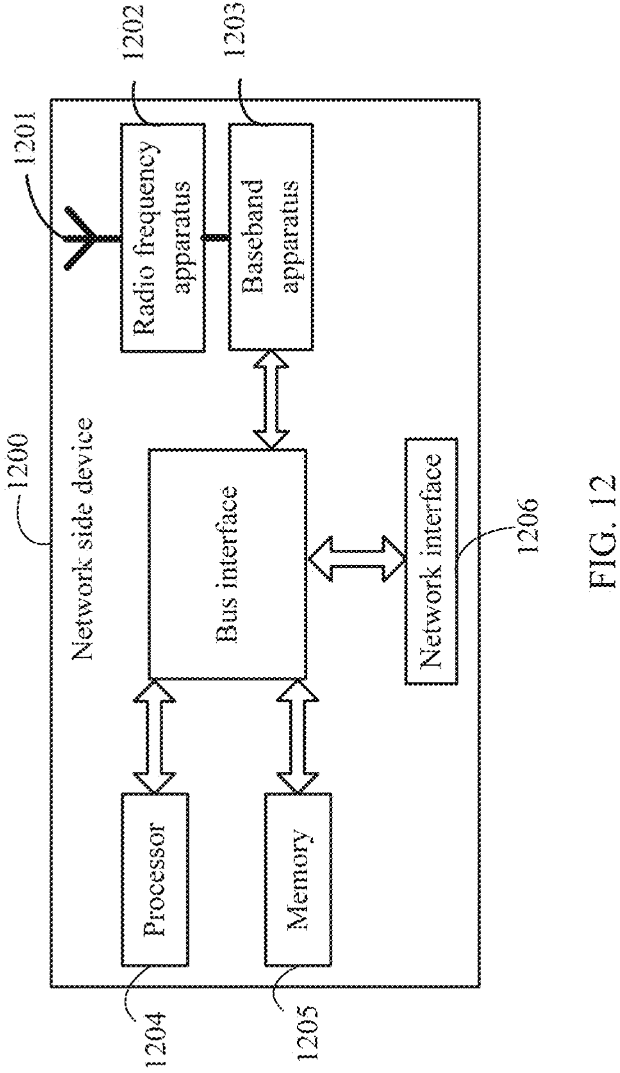
FIG. 12 is a schematic diagram of a communication device provided by an embodiment of the present application.

An embodiment of the present application further provides a network side device. As shown in FIG. 12, a network side device 1200 includes an antenna 1201, a radio frequency apparatus 1202, and a baseband apparatus 1203. The antenna 1201 is connected to the radio frequency apparatus 1202. In an uplink direction, the radio frequency apparatus 1202 receives information by using the antenna 1201, and sends the received information to the baseband apparatus 1203 for processing. In a downlink direction, the baseband apparatus 1203 processes to-be-sent information, and sends the to-be-sent information to the radio frequency apparatus 1202. After processing the received information, the radio frequency apparatus 1202 sends the information by using the antenna 1201.

The foregoing band processing apparatus may be located in the baseband apparatus 1203. In the foregoing embodiment, a method performed by the network side device may be implemented in the baseband apparatus 1203. The baseband apparatus 1203 includes a processor 1204 and a memory 1205.

The baseband apparatus 1203 may include, for example, at least one baseband board, where a plurality of chips are disposed on the baseband board. As shown in FIG. 12, one chip is, for example, the processor 1204, which is connected to the memory 1205, so as to invoke a program in the memory 1205 to perform operations of the network device shown in the foregoing method embodiment.

The baseband apparatus 1203 may further include a network interface 1206, configured to exchange information with the radio frequency apparatus 1202. For example, the interface is a common public radio interface (CPRI).

The network side device in embodiments of the present application further includes: instructions or programs stored in the memory 1205 and executable on the processor 1204. It can be understood that the processor 1204 invokes instructions or programs in the memory 1205 to execute the methods executed by the modules shown in FIG. 12 and achieve the same technical effect. To avoid repetition, details are not repeated here.

An embodiment of the present application further provides a computer program/program product, the computer program/program product is stored in a non-volatile storage medium, and when the computer program/program product is executed by at least one processor, the step of the processing method according to FIG. 4 is performed.

The embodiments of the present application also provide a readable storage medium, the readable storage medium may be nonvolatile or volatile, and a program or instruction is stored on the readable storage medium, and when the program or instruction is executed by the processor, each process of the embodiment of the method in FIG. 4 is performed, and the same technical effect can be achieved. To avoid repetition, details are not repeated herein.

The processor is a processor in the terminal in the foregoing embodiment. The readable storage medium includes a computer-readable storage medium, such as a computer Read-Only Memory (ROM), a Random Access Memory (RAM), a magnetic disk, or an optical disc.

The embodiments of the present application further provide a computer program product, the computer program product is stored in a non-transient storage medium, and the computer program product is executed by at least one processor to implement the various processes of the embodiments in FIG. 4, and the same technical effects can be achieved. To avoid repetition, details are not described herein again.

An embodiment of the present application further provides a chip, the chip includes a processor and a communication interface, the communication interface is coupled to the processor, and the processor is configured to run programs or instructions to implement each process of the embodiment of the foregoing method in FIG. 3 and the same technical effects can be achieved. To avoid repetition, details are not described herein again.

It should be understood that the chip mentioned in this embodiment of the present application may also be referred to as a system-level chip, a system chip, a chip system, or an on-chip system chip.

It should be noted that, in this specification, the term “include”, “comprise”, or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by “includes a . . . ” does not, without more constraints, preclude the presence of additional identical elements in the process, method, article, or apparatus that includes the element. In addition, it should be noted that the scope of the method and the apparatus in the embodiments of the present application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of the present application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air-conditioner, a network device, or the like) to perform the method described in the embodiments of the present application.

The embodiments of the present application are described above with reference to the accompanying drawings, but the present application is not limited to the above implementations, and the above implementations are only illustrative and not restrictive. Under the enlightenment of the present application, those of ordinary skill in the art can make many forms without departing from the purpose of the present application and the protection scope of the claims, all of which fall within the protection of the present application.

The invention claimed is:

1. A method of channel estimation, comprising:
- receiving, by a communication device, a pilot signal and a data signal;
- determining, by the communication device, a linear feature according to the pilot signal;
- determining, by the communication device, a nonlinear feature according to the data signal; and
- performing, by the communication device, channel estimation according to the linear feature and the nonlinear feature.

2. The method according to claim 1, wherein performing, by the communication device, the channel estimation according to the linear feature and the nonlinear feature comprises:
- performing, by the communication device, channel estimation through artificial intelligence according to the linear feature and the nonlinear feature.

3. The method according to claim 2, wherein determining, by the communication device, the nonlinear feature according to the data signal comprises:
- when using multiple-input multiple-output transmission, determining, by the communication device, the nonlinear feature according to the data signal by training a neural network.

4. The method according to claim 3, wherein receiving, by the communication device, the pilot signal and the data signal comprises:
- receiving, by the communication device, the pilot signal and the data signal via a resource element; and
- determining, by the communication device, the nonlinear feature according to the data signal by training the neural network comprises:
- training, by the communication device according to the pilot signal and the data signal, a nonlinear feature associated with the resource element; and
- training, by the communication device by using the trained nonlinear feature and the pilot signal, a channel associated with the resource element.

5. The method according to claim 1, wherein determining, by the communication device, the nonlinear feature according to the data signal comprises:
- performing, by the communication device, de-noising processing on the data signal; and
- determining, by the communication device, the nonlinear feature by using the denoised data signal.

6. The method according to claim 5, wherein performing, by the communication device, the de-noising processing on the data signal comprises:
- determining, by the communication device, a noise reduction channel block; and
- performing, by the communication device, de-noising processing on the data signal through the noise reduction channel block.

7. The method according to claim 6, wherein determining, by the communication device, the noise reduction channel block comprises:
- determining, by the communication device, a size of the noise reduction channel block according to one or more of a manner of receiving a signal, channel fading frequency selectivity, and a moving speed of the communication device; and
- the manner of receiving a signal comprises: receiving a signal in different consecutive time slots, or receiving a signal in an independent time slot.

8. The method according to claim 7, wherein in response to a determination that the communication device is a terminal, the method further comprises:
- receiving downlink control information; and
- determining the manner of receiving a signal according to the downlink control information.

9. The method according to claim 7, before determining, by the communication device, the size of the noise reduction channel block, further comprising:
- determining, by the communication device, channel fading frequency selectivity or the moving speed of the communication device.

10. The method according to claim 5, wherein performing, by the communication device, the de-noising processing on the data signal comprises:
- obtaining, by the communication device, a measured reference signal received power (RSRP) or a received signal strength indicator (RSSI);
- determining, by the communication device, a noise power spectral density according to the RSRP or the RSSI; and
- performing de-noising processing on the data signal according to the noise power spectral density.

11. The method according to claim 1, wherein the nonlinear feature comprises an amplitude feature of the data signal.

12. The method according to claim 11, wherein determining, by the communication device, the nonlinear feature by using the denoised data signal comprises:
- obtaining, by the communication device, a sum of squared values of amplitudes of all transmit antennas; and
- determining, by the communication device, the sum of the square values of the amplitudes as the amplitude feature of the denoised data signal.

13. The method according to claim 1, wherein the pilot signal comprises: a demodulation reference signal, a phase tracking reference signal, a channel state information reference signal, or a sounding reference signal.

14. A communications device, comprising: a memory storing a computer program; and a processor coupled to the memory and configured to execute the computer program to perform operations comprising:

receiving a pilot signal and a data signal;

determining a linear feature according to the pilot signal;

determining a nonlinear feature according to the data signal; and performing channel estimation according to the linear feature and the nonlinear feature.

15. The communications device according to claim 14, wherein performing the channel estimation according to the linear feature and the nonlinear feature comprises:

performing channel estimation through artificial intelligence according to the linear feature and the nonlinear feature.

16. The communications device according to claim 15, wherein determining the nonlinear feature according to the data signal comprises:

when using multiple-input multiple-output transmission, determining the nonlinear feature according to the data signal by training a neural network.

17. The communications device according to claim 16, wherein receiving the pilot signal and the data signal comprises:

receiving the pilot signal and the data signal via a resource element; and determining the nonlinear feature according to the data signal by training the neural network comprises:

training, by the communication device according to the pilot signal and the data signal, a nonlinear feature associated with the resource element; and training, by the communication device by using the trained nonlinear feature and the pilot signal, a channel associated with the resource element.

18. A non-transitory computer-readable storage medium, storing a computer program, when the computer program is executed by a processor, causes the processor to perform operations comprising:

receiving a pilot signal and a data signal;

determining a linear feature according to the pilot signal;

determining a nonlinear feature according to the data signal; and performing channel estimation according to the linear feature and the nonlinear feature.

19. The non-transitory computer-readable storage medium according to claim 18, wherein performing the channel estimation according to the linear feature and the nonlinear feature comprises:

performing channel estimation through artificial intelligence according to the linear feature and the nonlinear feature.

20. The non-transitory computer-readable storage medium according to claim 19, wherein determining the nonlinear feature according to the data signal comprises:

when using multiple-input multiple-output transmission, determining the nonlinear feature according to the data signal by training a neural network.

* * * * *